J. S. YAUKEY.
LATH AND BOLTING SAW MILL.
APPLICATION FILED JUNE 22, 1915.

1,162,538.

Patented Nov. 30, 1915.
2 SHEETS—SHEET 1.

Witnesses

Inventor
J. S. Yaukey,
By Victor J. Evans
Attorney

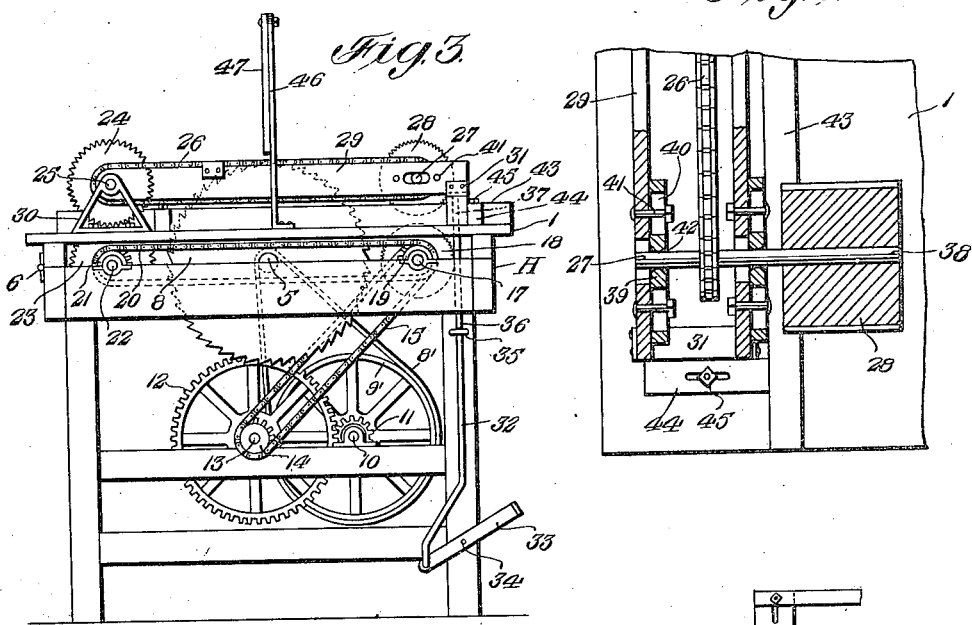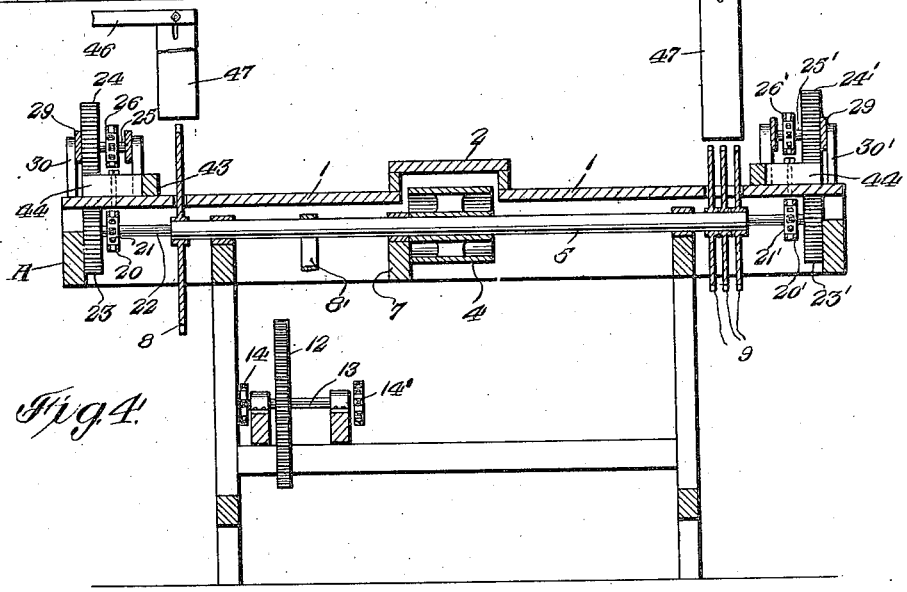

UNITED STATES PATENT OFFICE.

JEREMIAH S. YAUKEY, OF FAYETTEVILLE, PENNSYLVANIA.

LATH AND BOLTING SAW MILL.

1,162,538.

Specification of Letters Patent.

Patented Nov. 30, 1915.

Application filed June 22, 1915. Serial No. 35,608.

*To all whom it may concern:*

Be it known that I, JEREMIAH S. YAUKEY, a citizen of the United States, residing at Fayetteville, in the county of Franklin and State of Pennsylvania, have invented new and useful Improvements in Lath and Bolting Saw Mills, of which the following is a specification.

This invention relates to lath and bolting saw mills, the object in view being to produce an efficient machine of the class referred to which will rapidly saw lumber into strips and then into laths, palings, roofing laths and the like, the machine embodying novel work feeding mechanism which will relieve the operator or attendant of the tedious and laborious work of forcing the work through the machine by hand pressure and which will also prevent injury to the operator caused by the work being driven backwardly by the saw or saws.

A further object of the invention is to provide means whereby the feeding mechanism may be instantly adjusted to suit work of different or varying thicknesses and having uneven surfaces, the feeding mechanism thereafter being self-adjusting in accordance with the thickness of the material passing through the machine.

A further object of the invention is to provide means whereby one of the feed rolls may be adjusted to an angular position for the purpose of crowding the work against the gage on the saw table.

With the above and other objects in view, the invention consists in the novel construction, combination and arrangement of parts, as herein described, illustrated and claimed.

Figure 1:
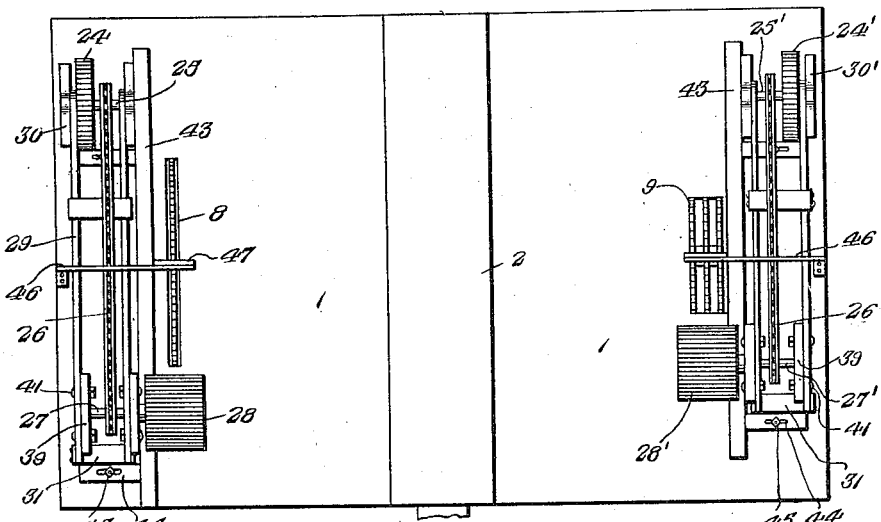
Figure 2:
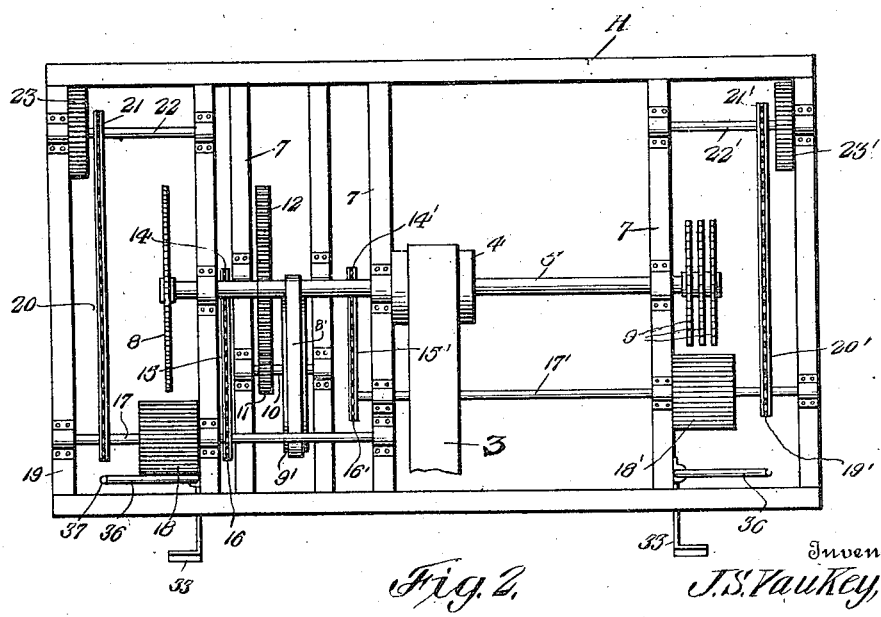

In the accompanying drawings:—Figure 1 is a plan view of a sawing machine embodying the present invention. Fig. 2 is also a plan view with the table and the mechanism above the table removed. Fig. 3 is an end elevation of the machine. Fig. 4 is a vertical longitudinal section through the machine taken about in line with the saw mandrel which is shown in elevation. Fig. 5 is a fragmentary horizontal section showing the means for adjusting the angle of one of the feeding rolls.

Referring to the drawings A designates a frame of suitable construction to support the parts and bearings therefor hereinafter particularly described.

1 designates the saw table which is divided into two approximately equal sections connected by a bridge or housing 2 for the driving belt 3 and driving pulley 4 on the saw mandrel 5, the sections 1 of the table being hinged at 6 to the frame of the machine at the rear thereof so that the front edge of the table section may be raised and lowered to give access to the mechanism contained beneath.

The saw mandrel 5 is supported in bearings on any desired number of cross bars 7 and is shown as having mounted fast on one end thereof a single circular saw 8 and on the other end thereof a plurality of circular saws 9, three of such being shown in proper spaced relation to each other to cut the lumber into laths or the like. The mandrel which is driven primarily by the belt 3 is connected by a belt 8' to a belt wheel 9' the shaft 10 of which has fast thereon a pinion 11 which drives a spur gear 12. Fast on the shaft 13 of the gear 12 are pinions 14 and 14' from which chains 15 and 15' extend around sprocket wheels 16 and 16' on shafts 17 and 17' arranged parallel to the shaft 5 and journaled in suitable bearings on the frame, the shafts 17 and 17' having lower feed rolls 18 and 18' fast thereon with their upper portions working slightly above the level of the top of the work table 1. From other sprocket wheels 19 and 19' fast on the shafts 17 and 17', sprocket chains 20 and 20' extend rearwardly around sprocket wheels 21 and 21' on a pair of relatively short shafts 22 and 22' parallel to the shafts 17 and 17' and journaled in bearings on the frame. On the shafts 22 and 22' there are mounted spur gears 23 and 23' which mesh with and drive superimposed spur gears 24 and 24' on the shaft 25 and 25' of which are mounted sprocket wheels from which chains 26 and 26' extend toward the front of the machine and pass around sprocket wheels fast on shafts 27 and 27' carrying upper feed rolls 28 and 28'.

Each upper feed roll 28 is carried by the free end of an arm 29 the rear end of which is pivotally mounted in relation to the table 1, being journaled on the shaft 25 or 25' which are shown as supported in bearing brackets 30 and 30' secured to the table and extending above the same. Each arm 29 embodies a pair of parallel side bars as shown in Figs. 1, 4 and 5, the forward ends of said side bars being connected by a bridge piece 31. Located beneath the bridge piece 31 and passing through a hole in the table 1 is a substantially vertical rod 32 the lower extremity of which is connected to the rear arm of a foot lever 33 fulcrumed at 34 on the frame, the rod 32 passing through one or more guides 35 on the frame. Between its ends, the rod 32 is offset as shown at 36 to bring the extremity 37 thereof under the respective bridge piece. It will now be seen that by depressing the forward extremity of the foot lever 33, the rod 32 will be thrust upwardly and by bearing against the bridge 31, will lift the arm 29 and therefore the respective upper feed roll 28 carried by said arm.

Referring now to Fig. 5 it will be observed that each upper feed roll 28 is mounted upon a spindle 38 which is journaled in bearing members 39 slotted as shown at 40 and connected by clamping bolts 41 to the side bars of the arm 29. The bearing openings in the bearing members 39 are flared in opposite directions as indicated at 42 and the bearing members are independently adjustable by means of the bolts or clamping members 41. This enables the spindle 39 to be set at an angle to the path of movement of the work so as to crowd the same against one of a pair of gages or gage strips 43 each of which is provided with laterally extending arms 44 slotted and adjustable by means of clamping bolts 45 or the equivalent thereof. Brackets 46 are secured to the table 1 and extend upwardly therefrom, serving as supports for dust shields or guards 47 which serve to prevent dust from flying in the face of the operator.

In operation, the work is entered between the upper and lower feed rolls and if necessary the upper feed roll is elevated by means of the foot lever 33 to admit the work. Thereafter the upper feed roll 28 rests by gravity on the top surface of the work, the feed roll being of sufficient weight to produce the necessary driving engagement, the feed roll rising and falling in accordance with any inequalities in the surface of the work and being therefore self-adjusting. Should the work become jammed against the saw and gage, the driving effect of the feed rolls may be instantly arrested by depressing the foot lever 33. By slightly canting the spindle 38, the upper feed roll 28 will act to crowd the work snugly against the adjacent cage 43.

The machine will greatly increase the output of a saw mill for the reason that the work is fed automatically to the saws after simply being inserted between the feed rolls. Furthermore, the feed rolls act to prevent the material from rebounding from the saw and injuring the operator. On account of the weight of the upper feed roll, no springs are required for holding the same against the work and furthermore the pressure of the upper feed roll is never excessive. When an extra heavy piece of lumber is to be bolted, the upper feed rolls are raised by depressing the foot lever and thereafter the upper feed roll will continue to hold the work properly in place on the table.

Each upper feed roll may be adjusted and will operate independently of the other, enabling the lumber to be sawed into bolts at one side of the machine and the bolts to be sawed into laths and palings on the other side of the machine.

Having thus described my invention, I claim:—

The combination with a saw, saw table, and side gage, of a lower feed roll on said shaft, an upper feed roll carrying arm having a pivotal mounting on the upper side of said table, an upper feed roll carried by the free end of said arm, a spindle on which said upper feed roll is fast, bearing members for said spindle located at opposite sides of said upper feed roll on said arm and having flared bearing openings, and means for adjusting said bearing members independently of each other to give an angular disposition to said spindle.

In testimony whereof I affix my signature in presence of two witnesses.

JEREMIAH S. YAUKEY.

Witnesses:
CHRISTIAN S. BARR,
WILLIAM GRANT LONG.

Copies of this patent may be obtained for five cents each, by addressing the "Commissioner of Patents, Washington, D. C."